United States Patent

[11] 3,571,517

[72] Inventor Amos E. Joel, Jr.
South Orange, N.J.

[21] Appl. No. 822,930
[22] Filed May 8, 1969
[45] Patented Mar. 16, 1971
[73] Assignee Bell Telephone Laboratories, Incorporated
Murray Hill, Berkeley Heights, N.J.

[54] AUTOMATIC INTERCEPT NUMBER IDENTIFICATION SYSTEM
14 Claims, 9 Drawing Figs.

[52] U.S. Cl. .......... 179/18, 179/27
[51] Int. Cl. .......... H04q 3/72, H04m 3/52
[50] Field of Search .......... 179/18.61, 27.24

[56] References Cited
UNITED STATES PATENTS
2,968,700 1/1961 Myers .......... 179/27

*Primary Examiner*—William C. Cooper
*Attorneys*—R. J. Guenther and James Warren Falk

ABSTRACT: A number identification arrangement for a crossbar telephone-switching system is disclosed wherein seizure of the number group by the marker on an intercepted call is used to transmit the digits of the called number to a special sender circuit. This circuit selects a trunk terminating in an intercept announcement system, transmits the called number to the announcement system over the selected trunk, and forces the marker to connect the calling party to the selected trunk. In the alternative, if the called number is in an unequipped thousands group so that the marker seizes a trunk terminating in an intercept announcement system without seizing a number group, the seized trunk in turn seizes a special sender circuit which then transmits a predetermined code to the announcement system over the seized trunk.

Patented March 16, 1971

3,571,517

9 Sheets-Sheet 1

INVENTOR
A.E. JOEL, JR.
BY
R. C. Winter
ATTORNEY

Patented March 16, 1971

3,571,517

9 Sheets-Sheet 2

AUTOMATIC INTERCEPT NUMBER IDENTIFICATION SYSTEM

BACKGROUND OF THE INVENTION

This invention relates to automatic telephone-switching systems and, more particularly, to arrangements for improving call intercept service in such systems.

In automatic telephone-switching systems, its is desirable to minimize the necessity for operator assistance in the handling of calls. Occasionally, a call cannot be completed to the number dialed by the calling party because that number has been disconnected, changed, or is otherwise unavailable for completion of the call in the normal manner. Where the number dialed by the calling party does not exist or has been disconnected, arrangements are known for intercepting and extending the call to a recorded announcement machine which provides suitable instructions to the calling party.

Some call situations, however, do not lend themselves to a uniform recorded announcement, but rather require individual service. An example of such a situation is where the called party has recently changed to a new directory number and the old directory number has not been reassigned. Priorly, telephone practice provided for the interception and routing of such calls to manual intercept operators who requested the number dialed by the calling party, referred to a changed number directory to determine the new number, and informed the calling party thereof.

The tremendous growth of telephone traffic in recent years has necessitated the development of an automatic intercept announcement system. Such a system is disclosed in the pending application of P.D. Hunter, Ser. No. 731,838, filed May 24, 1968. This automatic announcement system requires as its input the called directory number. This number could be obtained by an intercept operator from the calling party, but this technique has several inherent disadvantages. One such disadvantage is that human operators are still required, thus partially defeating the purpose of providing an automatic system. Another disadvantage is that the calling party will tell the operator the directory number he thought he dialed, which may not be the directory number he actually dialed. In such a case, when he gives the number he thought he dialed to the operator, there is no record of that number being on intercept. It is therefore desirable to provide circuitry at the local office responsive to a call to an intercepted number to automatically forward the directory number actually dialed to the intercept announcement system and to connect the calling party to that system.

An arrangement for providing this service in an automatic telephone-switching system of the step-by-step type is disclosed in my U.S. Pat. No. 3,143,601, issued Aug. 4, 1964. In a telephone system of the crossbar type, such as that described in U.S. Pat. No. 2,585,904, issued Feb. 19, 1952 to A. J. Busch, and referred to hereinafter as a crossbar office, the called directory number is stored in a register in the marker. It thus would appear to be a simple matter on intercept calls to have the marker connect the calling party to the intercept announcement system and to cause a sender to transmit to the announcement system the called directory number which is stored in the register. However, simple as this may appear, the costs involved in modifying the marker in an already existing crossbar office offset any savings which may be achieved through the use of an automatic intercept announcement system. It is therefore desirable to provide circuitry in a crossbar office, external to the marker and responsive to calls to intercepted directory numbers, for connecting the calling party to the intercept announcement system and for transmitting the called directory number to such system.

SUMMARY OF THE INVENTION

In accordance with this invention, apparatus is provided for transmitting a called directory number to an intercept announcement system from a crossbar office when a call is made to a directory number which is on intercept.

Each of the number groups in the crossbar office is connected to one of an equal number of identical circuits, hereinafter referred to as number group applique circuits. Seizure of a number group by the marker on an intercept call causes the associated applique circuit to be activated and to seize an idle intercept sender. The intercept sender in turn seizes an idle trunk terminating in the intercept announcement system. The applique circuit then transmits the called directory number to the intercept sender which outpulses this number to the intercept announcement system via the seized trunk. The trunks to the intercept announcement system are arranged so that the trunk seized by the intercept sender is the only one which appears idle to the marker. The marker is therefore forced to connect the calling party to the intercept announcement system over the seized trunk.

In the event that the called directory number is within an unequipped thousands group, there is no number group for the marker to seize. Instead, the marker seizes one of the trunks to the intercept announcement system. These trunks are arranged, in turn, to seize one of the intercept senders when a trunk is seized by the marker and not by a sender. The intercept senders are arranged to outpulse a predetermined code, indicating an unequipped thousands group, when they are seized by a trunk rather than by a number group applique circuit.

DESCRIPTION OF THE DRAWING

The foregoing may become more apparent by referring now t the drawing in which.

GENERAL DESCRIPTION

The arrangements and operation of the various components in the illustrative embodiment of this invention will be described subsequently with reference to the detailed FIGS. 2——9. However, in order to first gain an overall understanding of the arrangement contemplated, a brief and general description will be given with reference to block diagram in FIG. 1.

Figure 1:
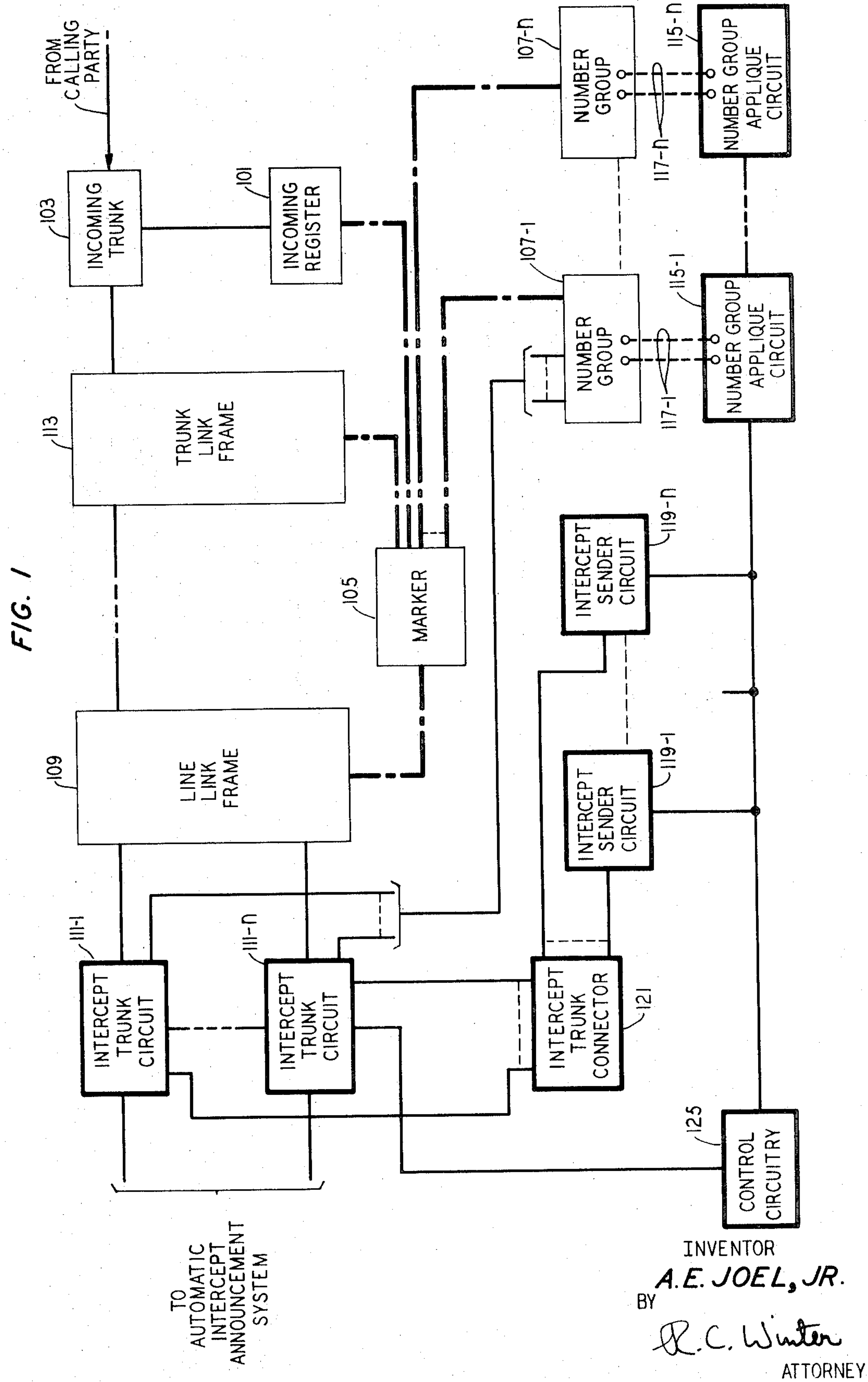
FIG. 1 shows a conceptual block diagram of an illustrative crossbar office operating in accordance with the principles of the present invention.
Figure 2:
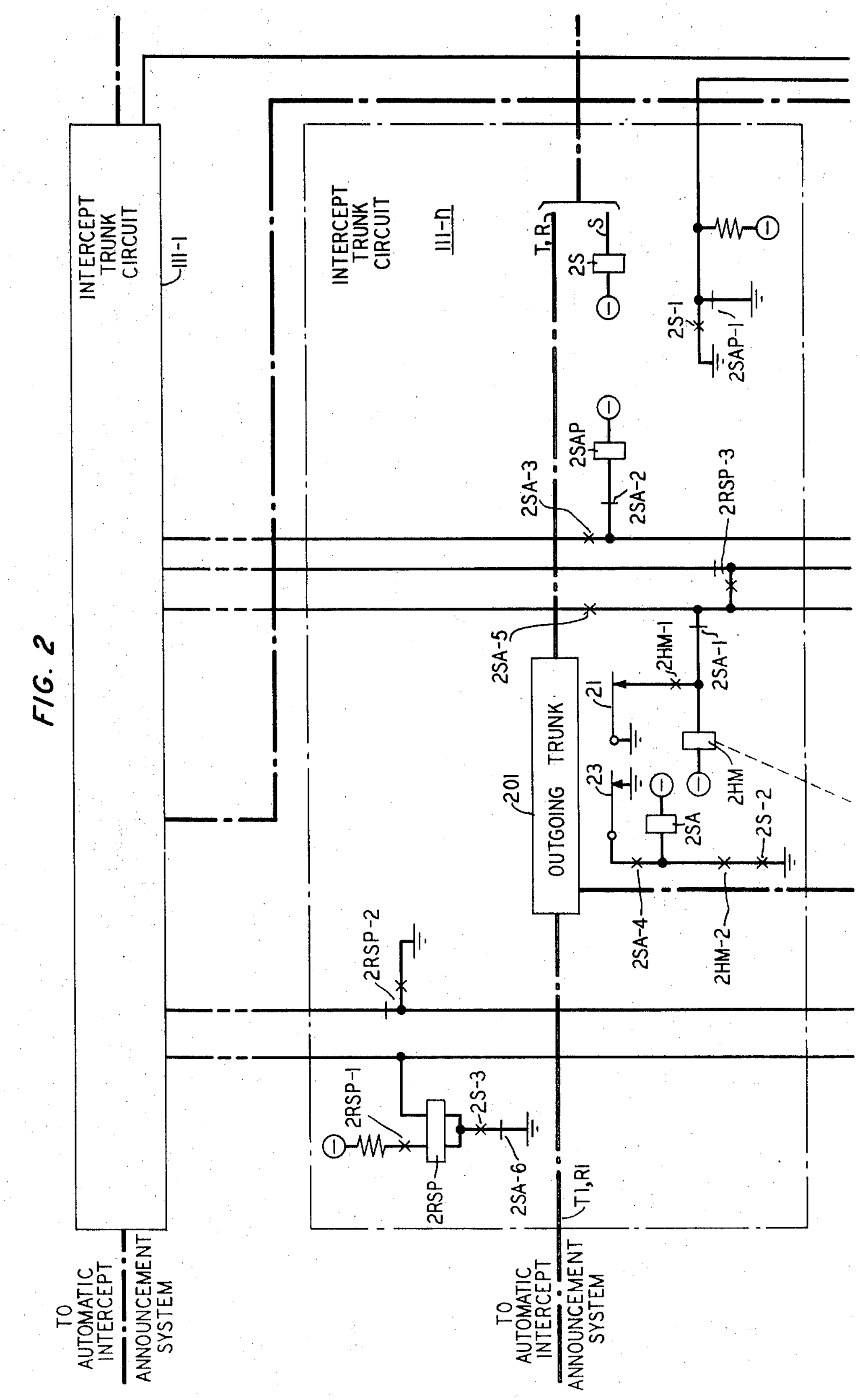
FIGS. 2—8, when arranged as shown in FIG. 10, provide an expanded block diagram of the system depicted in FIG. 1, wherein the portions of the system necessary for an understanding of an illustrative embodiment of the present invention are represented in greater detail.

Turning now to FIG. 1, there is shown a block diagram of a crossbar telephone system of the type described in the aforementioned Busch patent. In order to operate this system in accordance with the principles of the present invention, peripheral circuitry has been added in the heavy outlined blocks in FIG. 1.

As described in the Busch patent, a calling party transmits the called number to incoming register 101 via incoming trunk 103. Marker 105 interrogates one of the number groups 107–1 through 107–*n*, depending upon the thousands digit of the called number, to determine the physical location on line link frame 109 where the line corresponding to the called number terminates. In the event that the called number is on intercept because the calling party has dialed a number corresponding to an unequipped thousands group, marker 105 cannot interrogate a number group and will connect the calling party to one of the intercept trunk circuits 111–1 through 111–*n* via incoming trunk 103, trunk link frame 113, and line link frame 109.

Frequently the called number is within an equipped thousands group but is on intercept for one of several reasons; for example, the called party has recently changed his number. In this event, when market 105 interrogates the proper number group in accordance with the dialed thousands digit, the interrogated number group will not have a line link frame location to return to marker 105. Marker 105, not receiving any information from the interrogated number group, will time out and connect the calling party to one of the intercept trunk circuits 111–1 through **111–*n* via incoming trunk 103, trunk link frame 113, and line link frame 109**.

As is described in the Busch patent, and in more detail hereinafter, each of the 1,000 directory numbers whose line locations on the line link frame 109 are supplied to market 105 by the corresponding number group is associated with a unique set of terminals in the number group. In accordance with the present invention, identical number group applique circuits 115–1 through **115–*n* are provided individual to each of the number groups 107–1 through 107–*n*. When a number is placed on intercept, its set of terminals in the number group is connected to a corresponding set of terminals in the associated applique circuit by means of cross-connection fields 117–1 through 117–*n***, to be fully described later with reference to FIGS. 4, 5 and 8.

When marker 105 seizes a number group in response to a call to an intercepted number, battery applied over the cross-connections from the corresponding set of terminals in the number group to the corresponding set of terminals in the applique circuit activates the applique circuit. The activated applique circuit causes control circuitry 125 to seize and connect the applique circuit to one of the intercept sender circuits 119–1 through **119–*n* in accordance with a preference chain linking these sender circuits. Intercept trunk circuits 111–1 through 111–*n* are likewise linked by a preference chain so that at any given time only one of these trunk circuits appears idle. The seized sender circuit is then connected to the "idle" trunk circuit by control circuitry 125 through intercept trunk connector 121**.

Marker 105, not having received any information from the seized number group, commences its built-in sequence of steps to connect the calling party to one of the intercept trunk circuits 111–1 through **111–*n*. One of these steps is the interrogation of number group 107–1 to determine the location on line link frame 109 of an idle one of intercept trunk circuits 111–1 through 111–*n*. As was mentioned above, and to be described in further detail below, only one of trunk circuits 111–1 through 111–*n* appears idle and number group 107–1 transmits to marker 105 the location on line link frame 109** of this "idle" intercept trunk circuit. This is the same intercept trunk circuit which is now connected to an intercept sender circuit.

At the time that the intercept sender circuit was connected to one of the number group applique circuits 115–1 through **115–*n***, that applique circuit transmitted to the sender circuit the called number which it received from its corresponding number group over the cross-connection field. The sender circuit outpulses this called number over the trunk circuit to which the calling party is now connected.

Though not relevant to an understanding of this invention, the automatic intercept announcement system on which the intercept trunk circuits 111–1 through **111–*n*** are terminated is equipped to return a vocal message to the calling party advising him of the status of the called number.

In the event that the called number is in an unequipped thousands group, marker 105 is designed to connect the calling party to one of the intercept trunk circuits 111–1 through **111–*n*. As was mentioned above, only one of these trunk circuits appears idle. Marker 105 connects the calling party to this "idle" trunk circuit. The seized trunk circuit distinguishes the fact that it has been seized by marker 105 rather than by one of intercept sender circuits 119–1 through 119–*n*, and it then causes control circuitry 125 to seize and connect one of the sender circuits to the trunk circuit through intercept trunk connector 121. Control circuitry 125** then transmits to the seized sender circuit a predetermined code indicative of an unequipped thousands group. This code is outpulsed by the sender circuit to the automatic intercept announcement system over the intercept trunk circuit to which it is connected. The automatic intercept announcement system is equipped, in a manner not here relevant, to interpret this code and supply the proper message to the calling party.

DETAILED DESCRIPTION

Having briefly described this invention with respect to the block diagram of FIG. 1, a more detailed description of those portions of the illustrative system which are not known in the prior art will now be given with respect to FIGS. 1—9.

Beginning at column 80 in the aforementioned Busch patent, there is a detailed description of the operation of the number group. However, a brief description will be given below of those aspects of the number group operation which are deemed necessary for a complete understanding of the details of this invention. For the purposes of this description, it is assumed that the calling party has dialed the number 4,456 within the central office of FIGS. 2—9, and it is further assumed that this number is on intercept and is included within an equipped thousands group.

Figure 3:
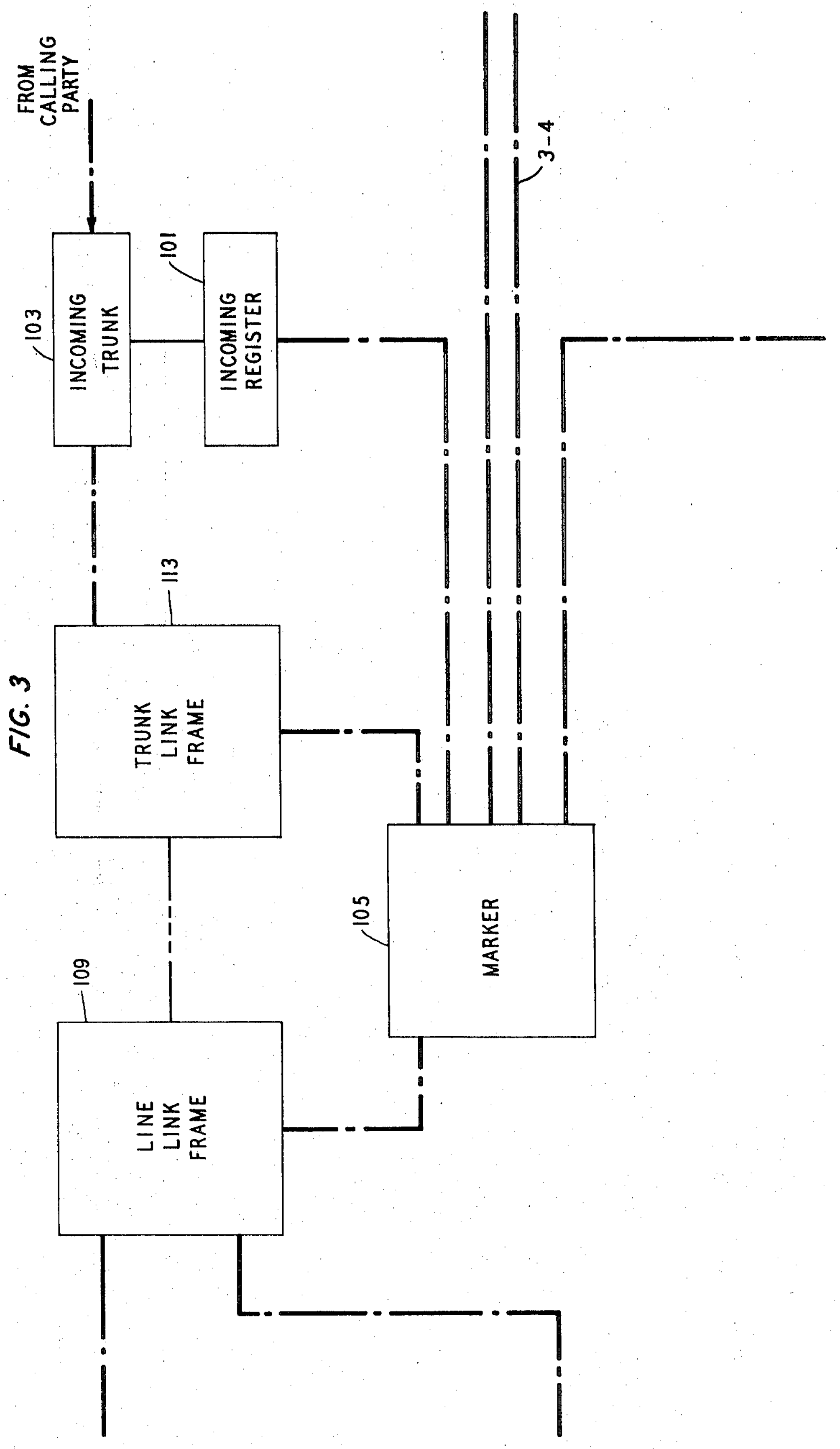

As set forth in the Busch patent, incoming register 101, FIG. 3, receives the called number 4,456 and transmits this number to marker 105. Having received the called number, marker 105 must ascertain the location on line link frame 109 at which the station assigned to the called number is terminated. To aid in translating the four-digit number into an equipment location, a number group frame is used. As explained more fully in the aforementioned Busch patent, each number group frame serves 1,000 telephone numbers and is capable of translating each telephone number into a line link frame, vertical group, horizontal group and vertical file equipment location, as well as the ringing combination which is assigned to that number. This is accomplished by seizing control of the particular number group based on the thousands digit of the called number and then, through a relay tree in the number group, applying battery to terminals associated with the hundreds, tens and units digits of the called number.

Figure 4:
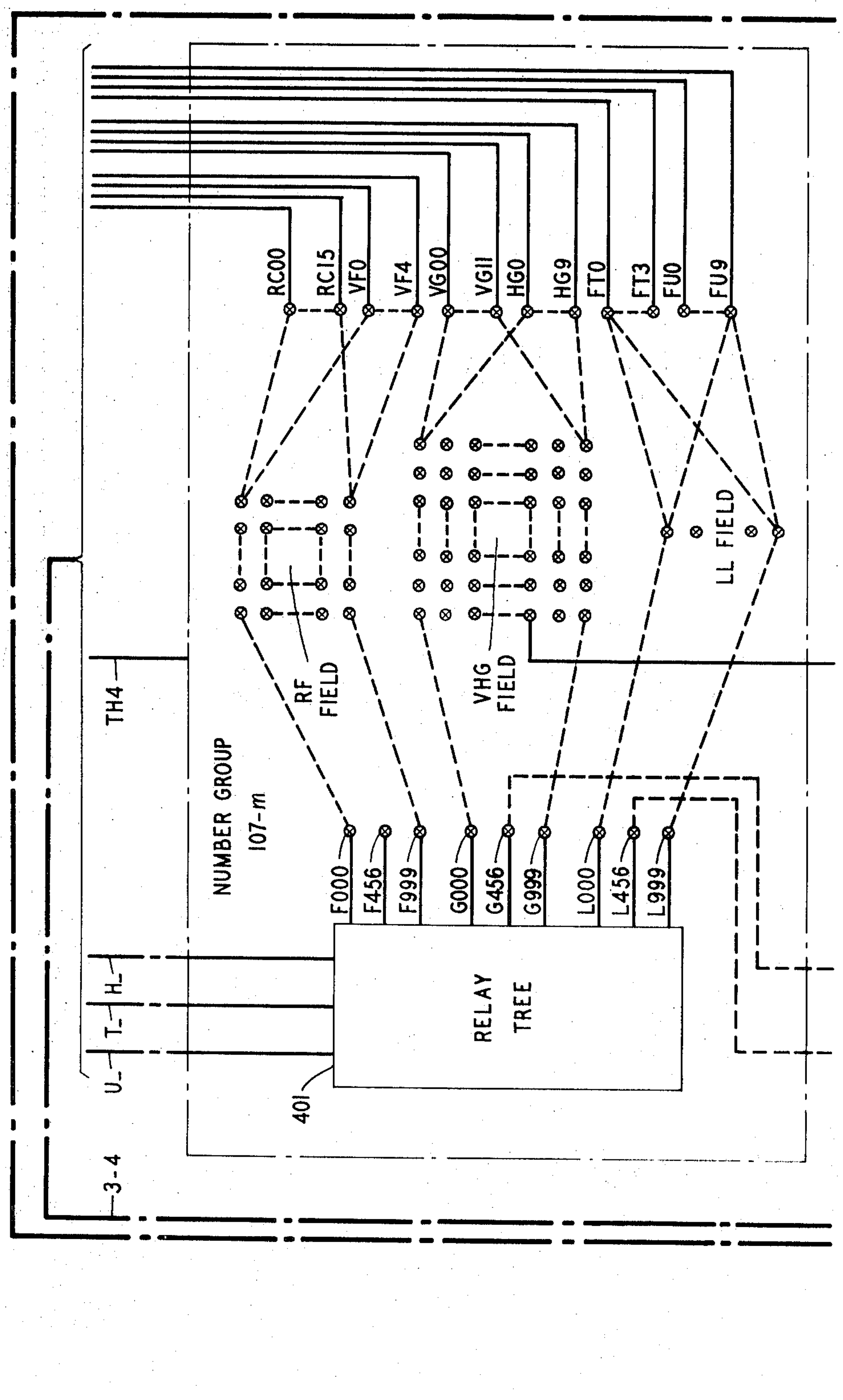

Number group **107–*m*, FIG. 4, is the number group for translating the equipment location of numbers from 4,000 to 4,999, inclusive. Since the number to be translated is 4,456, marker 105 seizes control of number group 107–*m* over conductor TH4 in cable 3–4. Having seized control of number group 107–*m*, the hundreds, tens and units digits are transmitted from marker 105 to number group 107–*m* over the appropriate conductors of hundreds group H, tens group T and units group U in cable 3–4. In this instance, the appropriate conductors would be H4, T5 and U6. In number group 107–*m*, through the operation of relay tree 401, the terminals F456, G456 and L456** have battery applied thereon.

If number 4,456 was not on intercept, terminals F456, G456 and L456 would be cross-connected to terminals in the RF field, VHG field, and LL field, respectively. The terminals in the RF field are cross-connected to provide the ringing combination and vertical file location of the called number. The terminals in the VHG filed are cross-connected to provide the vertical group and horizontal group of the called number. The terminals in the LL field are cross-connected to provide the line link frame of the called number. Thus, as fully described in the aforementioned Busch patent, the applied battery signal travels through the number group via the aforementioned cross-connections and back to the market over cable 3–4, providing the marker with the equipment location and ringing combination of the called number.

However, if a number is placed on intercept, the L and F cross-connections are ordinarily removed. The G cross-connection is not disturbed, and the marker is designed to connect the calling party to an intercept trunk circuit in the event that information is received only from the G cross-connection in the number group. In accordance with my invention, an applique circuit is associated with each number group, and when a number is placed on intercept, the F cross-connection is removed and the G and L cross-connections are replaced with cross-connections from the G and L terminals in the number group to the applique circuit associated with that number group. The applique circuits are identical in all respects except for cross-connections.

Figure 5:
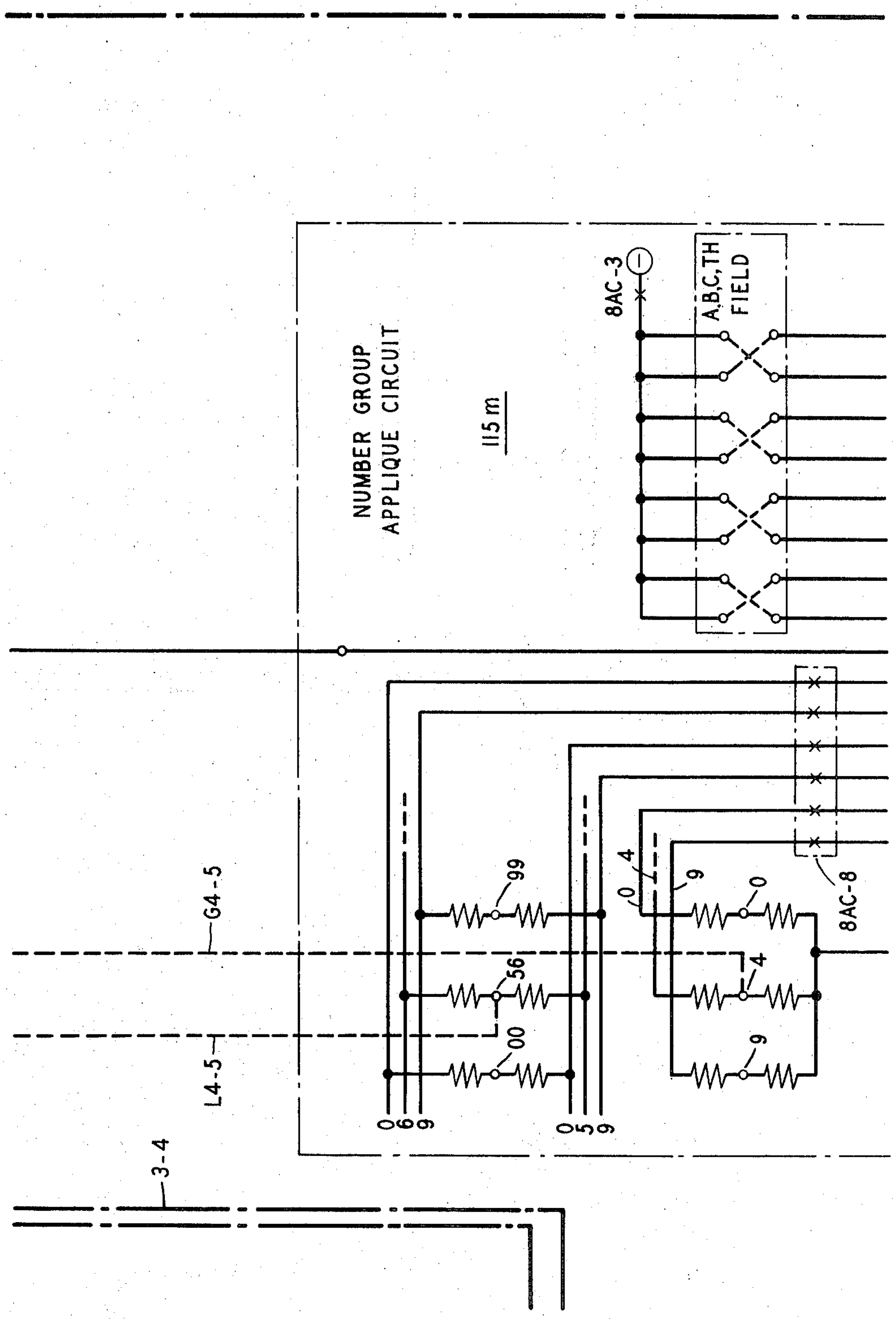
Figure 8:
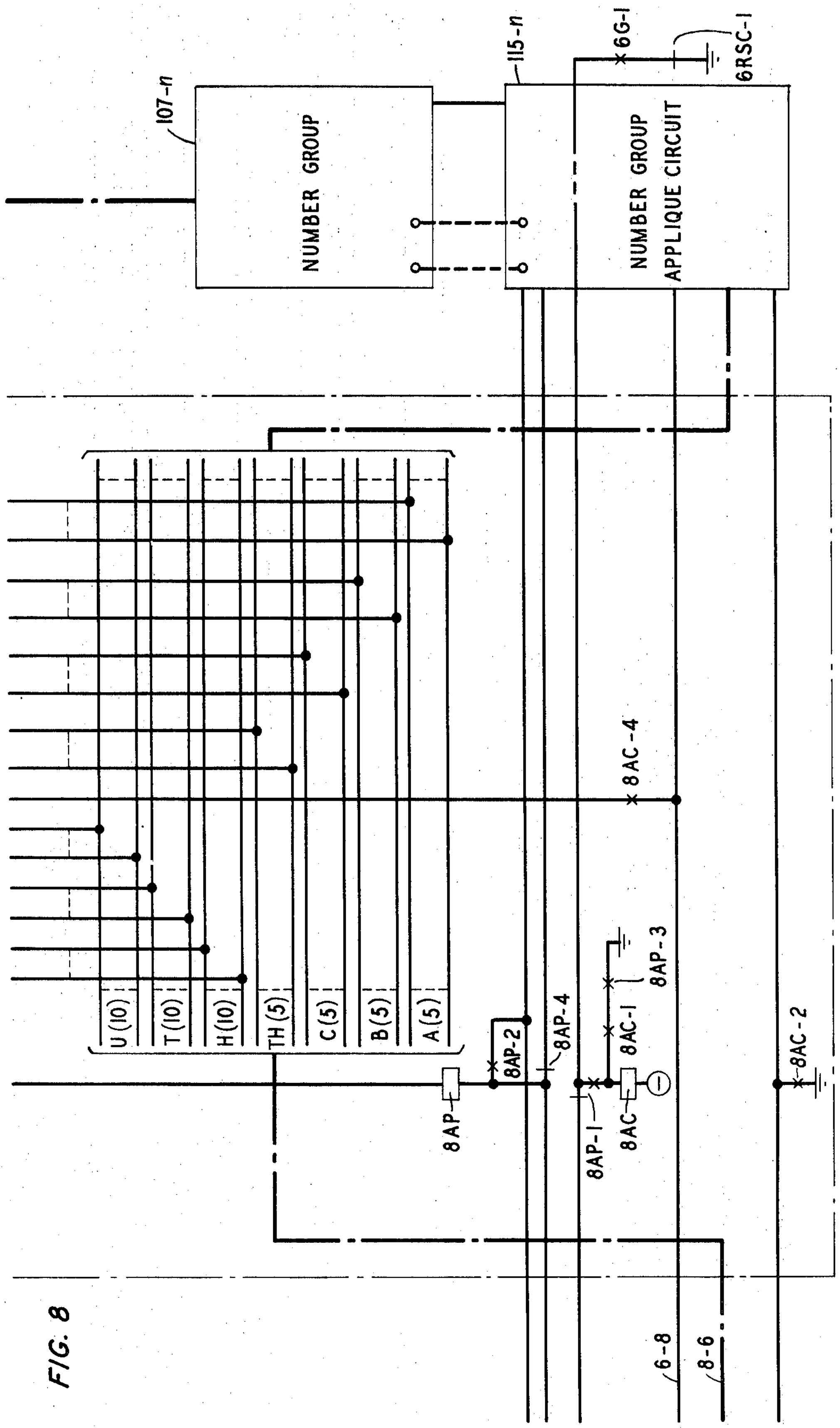

Thus, when number 4,456 is placed on intercept, terminal L456 is cross-connected to terminal 56 in number group applique circuit 114–*m*, FIGS. 5 and 8, via conductor L4-5. This terminal is one out of one hundred terminals which merely reproduce the tens and units digits of the number on intercept. Terminal G456 in number group 107–*m* is cross-connected to terminal 4 in number group applique circuit 115–*m* via conductor G4–5. Terminal 4 is one out of ten terminals which reproduce the hundreds digit of the intercepted number.

Figures 6, 10:
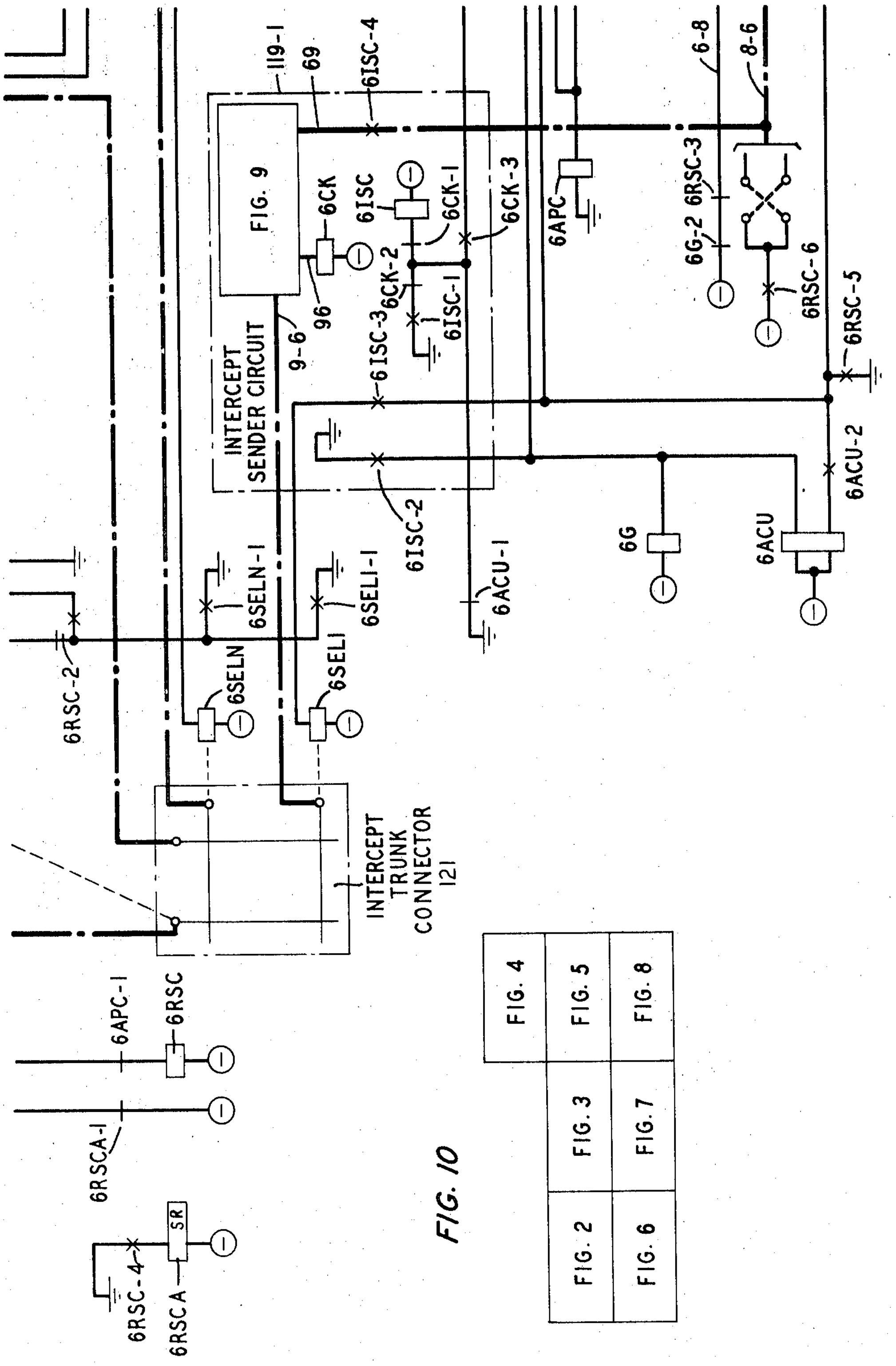

When marker 105 seizes number group 107–*m* in response to a call to number 4,456, the battery applied through relay tree 401 to terminal G456 is transmitted over conductor G4–5 to terminal 4 where it attempts to operate applique preference relay 8AP, FIG. 8, and relay 6APC, FIG. 6. Relay 8AP will be operated through a series chain of break contacts on the applique preference relays in the applique circuits to the left of applique circuit 115–*m* and the winding of relay 6APC to ground, if none of the applique preference relays in the applique circuits to the left of applique circuit 115–*m* are operated. With relay 8AP operated, applique connector relay 8AC, FIG. 8, will be operated through the make-contact of transfer contacts 8AP–1, a series chain of break contacts of the applique preference relays in the applique circuits to the right of applique circuit 115–*m*, operated make-contact 6G–1, described hereinafter, and break contact 6RSC–1 to ground if none of the applique preference relays in applique circuits to the right of applique circuit 115–*m* are operated.

Relays 8AP and 8AC together are part of what is known as an end relay preference lockout circuit. Such a circuit is described in my article "Relay Preference Lockout Circuits in Telephone Switching," AIEE Transactions, vol. 67, (1948), pp. 1,720—1,725. This type of circuit allows only one pair of AP and AC relays to operate at any given time. Relay 8AP is locked up around the preference chain through contact 8AP–2 and relay 8AC is locked to ground through contacts 8AC–1 and 8AP–3.

Before continuing the description of number group applique circuit 115–*m*, a digression to intercept sender circuit 600, FIG. 6, is in order. Assuming that check relay 6CK is not operated, the idle sender circuit relay 6ISC in intercept sender circuit 119–1 operates over a path from battery through the winding of relay 6ISC, normally closed contact 6CK–1 and normally closed contact 6ACU–1 to ground. Relay 6ISC then locks up through a path including normally closed contact 6CK–2 and operated make contact 6ISC–1. The operation of relay 6ISC causes the operation of relays 6G and 6ACU over the path to ground including make contact 6ISC–2. Relay 6ACU is then locked up through the path from battery through the hold winding of relay 6ACU, make contact 6ACU–2, make contact 8AC–2, FIG. 8, to ground.

It is to be noted that relay 6ISC operated previously to, and independently of, the seizure of number group applique circuit 115–*m*. If the idle sender circuit relay in any of the intercept sender circuits had not operated, indicative of the fact that none of the intercept sender circuits was idle, then relay 6G would not have operated. The nonoperation of relay 6G would have precluded the closure of contact 6G–1, FIG. 8, and thereby prevented the operation of one of the applique connector relays, namely 8AC.

The concurrent operation of relay 6ISC and relay 8AC causes select magnet relay 6SEL1, FIG. 6, to operate over the path from battery through the winding of relay 6SEL1, contact 6ISC–3, and contact 8AC–2, FIG. 8, to ground. Select magnet relay 6SEL1 is part of intercept trunk connector 121, FIG. 6, which for purposes of this illustrative embodiment may be considered to be a crossbar switch. The operation of relay 6SEL1 closes a path from ground through make contact 6SEL1–1, normally closed contact 6RSC–2, normally closed contact 2SA–1, and through the winding of hold magnet relay 2HM, FIG. 2, to battery, thereby causing relay 2HM to operate. Hold magnet relay 2HM is part of connector 121 and causes intercept trunk circuit 111–*n*, FIG. 2, to be connected to intercept sender circuit 119–1 through intercept trunk connector 121. When relay 2HM operates, it locks itself to ground through contact 2HM–1 and normally closed symbolic switch 21.

Returning now to number group applique circuit 115–*m*, it will be recalled that battery has been applied to terminals 4 and 56. These terminals are part of a resistor-decoder network which transmits the applied battery through a bank of contacts of applique connector relay 8AC, designated 8AC–8, FIG. 5, to corresponding conductors in cable 8–6. Contact 8AC–3 applies battery through the A, B, C, TH field to other conductors in cable 8–6. This cable transmits the called number from number group applique circuit 115–*m* to intercept sender circuit 119–1. The A, B, C, TH field in each number group applique circuit is wired in a predetermined manner to supply a two-out-of-five code representing the A, B, C, and thousands digits corresponding to the number group associated with the applique circuit. The hundreds, tens, and units digits of the called number are transmitted to intercept sender circuit 119–1 in one-out-of-ten representations.

Figure 9:
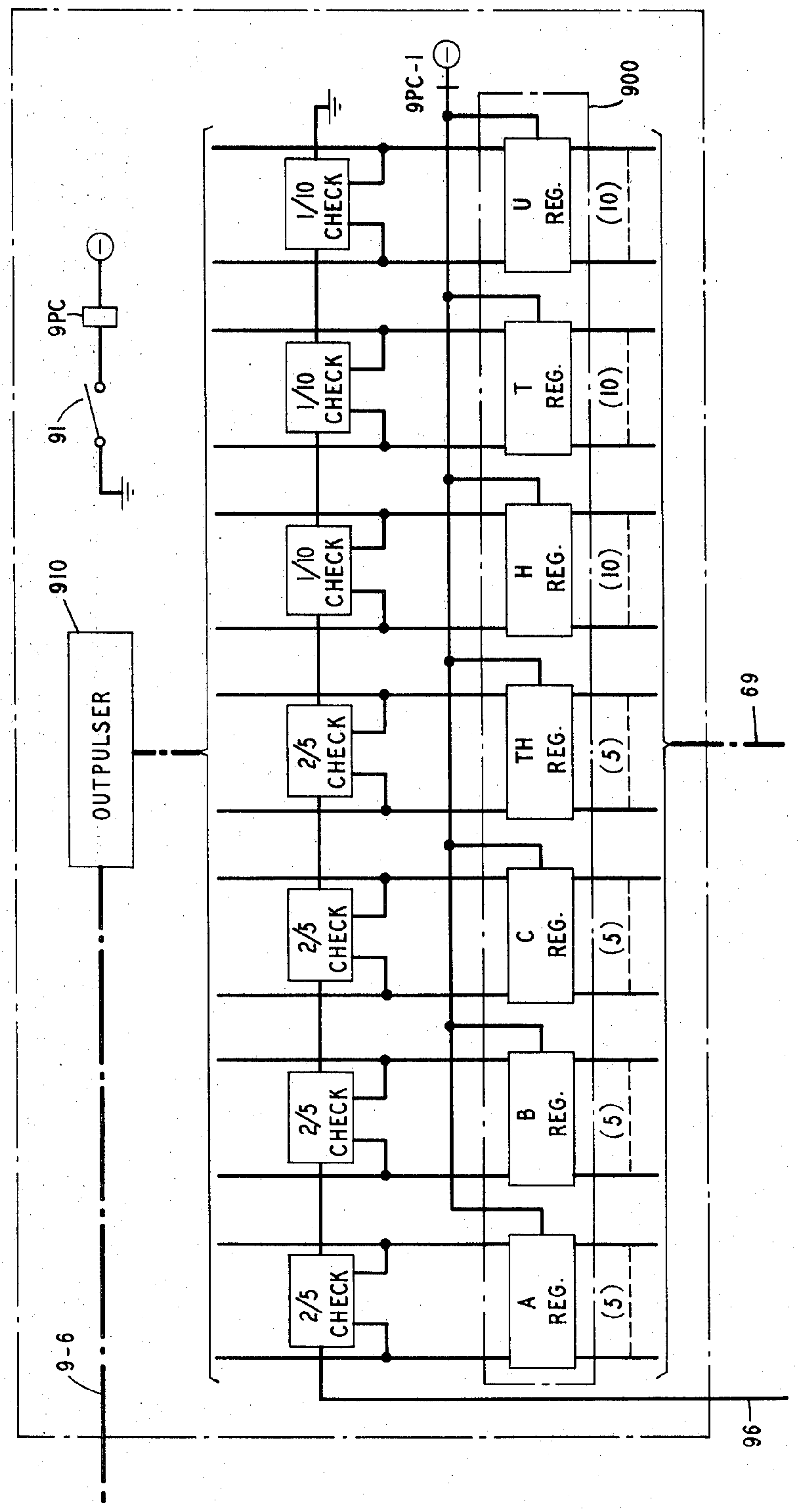
FIG. 9 depicts elements of the intercept sender circuit in greater detail.

The called number is thus transmitted over cable 8–6 to intercept sender circuit 119–1 where it passes through contacts 6ISC–4 and into register 900, FIG. 9, via cable 69. This register may be of the type described in the book The Design of Switching Circuits by Keister, Ritchie and Washburn. The digits in register 900 are locked up through normally closed contact 9PC–1. Each digit in register 900 is checked by one of a series chain of check circuits which may be of the type disclosed in the aforementioned Keister, Ritchie and Washburn book. Proper registration of the digits of the called number in register 900 causes the check circuits to close a path from ground over conductor 96 to the winding of check relay 6CK, FIG. 6, and through this winding to battery, thereby causing the operation of relay 6CK.

The operation of relay 6CK opens the path between the winding of relay 6ISC and ground. This causes relay 6ISC to release. The release of relay 6ISC opens contact 6ISC–3, thereby releasing relay 6SEL1. Contact 6ISC–2 also opens and releases relay 6G. The release of relay 6G causes battery to be transmitted through contact 6G–2, contact 6RSC–3, over conductor 6–8, and through contact 8AC–4 in number group applique circuit 115–*m* to one of the terminals in the VHG field of number group 107–*m*. It is immaterial to which of the terminals in the VHG field of number group 107–*m* is connected number group applique circuit 115–*m*. This battery signal is then transmitted through cable 3–4 to marker 105. Marker 105, realizing that it has received battery back only from the VHG field, will commence its sequence of steps leading to the connection of the called party to an intercept trunk. The first step is to release number group 107–*m*.

Figure 7:
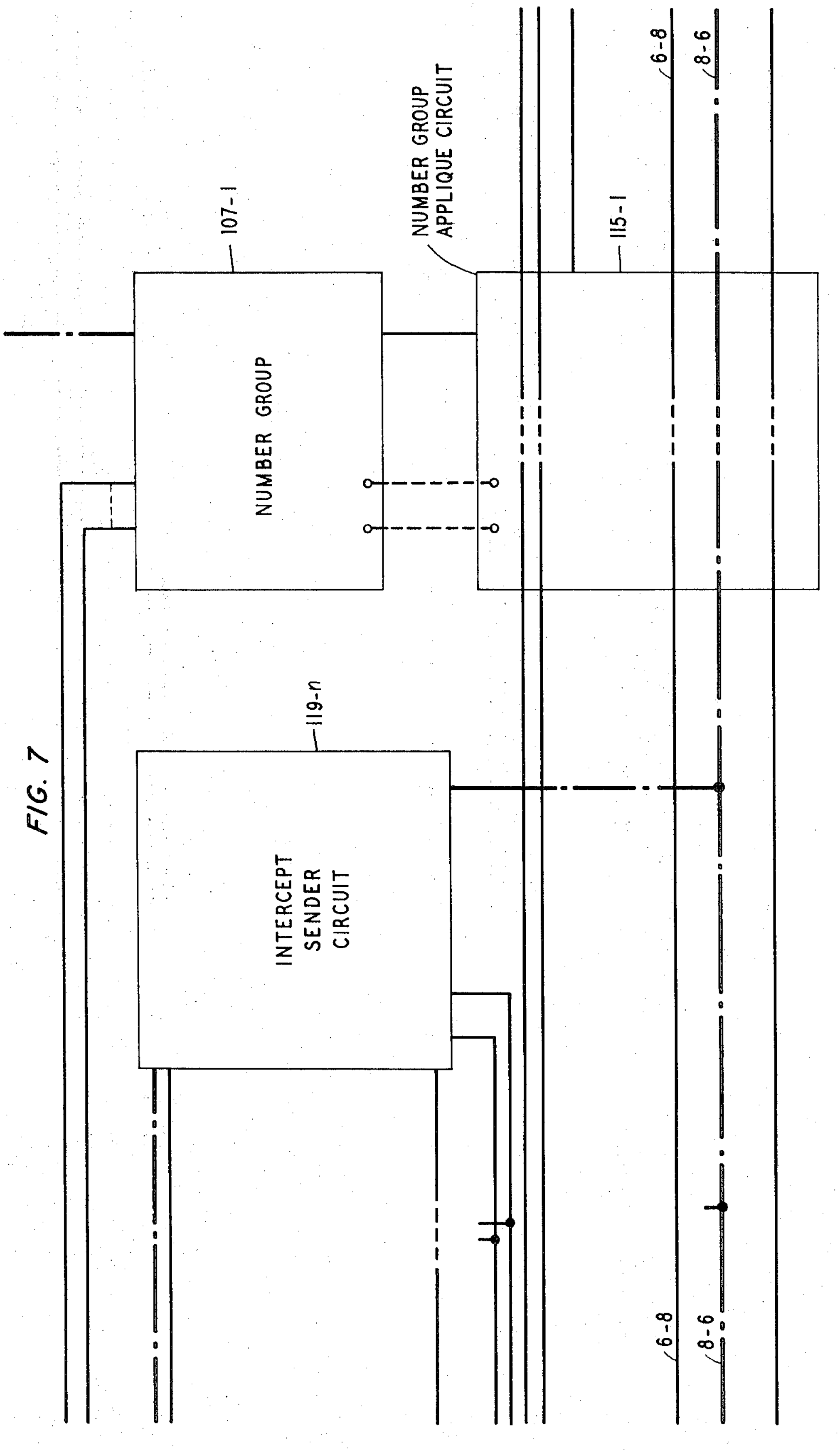

Marker 105 then interrogates number group 107–1, FIG. 7, in order to determine which of the intercept trunk circuits is idle so that it may connect the calling party thereto. All of the intercept trunk circuits are connected to number group 107–1, and marker 105 treats these trunk circuits as it would a PBX hunting group. Relay 2SAP in intercept trunk circuit 111–*n*, FIG. 2, had been operated over the path from battery through the winding of relay 2SAP and through normally closed contact 2SA–2 to ground. Normally open contact 2SA–3 prevents the operation of the SAP relay in any of the other intercept trunk circuits, contacts 2SA–2 and 2SA–3 being part of a preference chain linking the intercept trunk circuits. Therefore, the only operated SAP relay is relay 2SAP in intercept trunk circuit 111–*n*. Relay 2S is not yet operated so normally open contact S–1 and break contact 2SAP–1 prevent a ground from appearing on the lead from intercept trunk circuit 111–*n* to number group 107–1.

The absence of a ground on this lead indicates to marker 105 that intercept trunk circuit 111–*n* is idle. Since the SAP relay in all other intercept trunk circuits is not operated, the corresponding leads between these trunk circuits and number group 107–1 will all be grounded, indicating to marker 105 that these trunk circuits are busy. Therefore, marker 105 has no choice but to connect the calling party to intercept trunk circuit **111–*n***. The reader will recall that this is the trunk circuit which has been connected to the intercept sender circuit containing the digits of the called number. It is therefore apparent that the marker has been forced to connect the called party to a predetermined trunk.

As previously mentioned, number group **107–*m* has been released by marker 105. This release removed the applied battery from terminals 4 and 56 in number group applique circuit 115–*m*. Removal of battery from terminal 4 causes relay 8AP, and thereafter relay 8AC, to release. Relays 6APC and 6ACU will also release. A path is now complete from ground through normally closed contact 6ACU–1 and make contact 6CK–3** to operate the idle sender circuit relay of the next idle intercept sender circuit.

When marker 105 seized intercept trunk circuit **111–*n*, sleeve lead S was grounded, thereby operating relay 2S. When relay 2S operated, closure of contact 2S–2 completed the path from ground through previously closed contact 2HM–2 and through the winding of relay 2SA to battery, thereby operating relay 2SA which then locks up through contact 2SA–4 and normally closed symbolic switch 23 to ground. Contacts 2SA–3 and 2SA–5 now close and advance the choice of trunks to the next idle one. Relay 2SAP releases due to the opening of contact 2SA–2. The operation of relay 2S and the release of relay 2SAP ground the lead from intercept trunk circuit 111–*n* to number group 107–1, an indication that intercept trunk circuit 111–*n*** is busy.

Outpulser 910, FIG. 9, part of intercept sender circuit 119–1, outpulses the digits contained in register 900 over cable 9–6 and through intercept trunk connector 121 to outgoing trunk 201 and thence over leads T1 and R1 to the automatic intercept announcement system. After the completion of the pulsing, the pulsing complete relay 9PC is operated through the closure of symbolic switch 91. The operation of relay 9PC opens contact 9PC–1, thereby unlocking the contents of register 900. This causes the check circuits to open the path from ground to check relay 6CK. Relay 6CK is therefore released. The release of relay 6CK allows idle sender circuit relay 6ISC to reoperate in the manner described above. Thus, intercept sender circuit 119–1 is free to serve another intercept call. It will be noted that the release of relay 6CK opens contact 6CK–3, and no other intercept sender circuit will have its idle sender circuit relay operated.

After outpulsing is completed and outgoing trunk 201 cuts through the calling party of the automatic intercept announcement system, symbolic switch 21, controlled through intercept trunk connector 121 by the opening of symbolic switch 91, opens the locking path for hold magnet relay 2HM. The release of relay 2HM disconnects intercept trunk circuit **111–*n* from intercept trunk connector 121. When the calling party hangs up and intercept trunk circuit 111–*n* is dropped by the marker, relay 2S is released. Symbolic switch 23 opens and releases relay 2SA. This restores intercept trunk circuit 111–*n* to the idle mode by causing the reoperation of relay 2SAP**.

The foregoing description was based upon the assumption that the called number was associated with a number group. However, in many instances a calling customer will dial a number that is within an unequipped thousands group. In such a case there will be no number group associated with that called number. For the purposes of the following description, it will be assumed that the calling party has dialed such a number and this number has been stored in incoming register 101, FIG. 3. A description of the operation of the system will be given only for those aspects of the operation that differ significantly from the operation described above.

When marker 105 receives the called number from incoming register 101 and discovers that this number is not associated with any number group, marker 105 interrogates number group 107–1 in order to pick an idle one of the intercept trunk circuits. It will be assumed, for the purposes of this description, that intercept trunk circuit **111–*n*, FIG. 2, is the one intercept trunk circuit that has its lead to number group 107–1 ungrounded, thereby appearing to be the only idle one of the intercept trunk circuits. When marker 105 seizes intercept trunk circuit 111–*n*, a ground is placed on lead S, thereby causing relay 2S** to operate.

The operation of relay 2S closes a path from ground through normally closed contact 2SA–6, make contact 2S–3 the operate winding of relay 2RSP, and normally closed contact 6RSCA–1 FIG. 6, to battery. Relay 2RSP then locks to battery through its hold winding and make contact 2RSP–1. Assuming that none of the number group applique circuits are bidding for a sender, relay 6APC is not operated. Therefore, relay 6RSC will operate over a path from battery through the winding of relay 6RSC, normally closed contact 6APC–1, and make contact 2RSP–2 to ground. Break contact 2RSP–2 prevents any other intercept trunk circuit from operating relay 6RSC. Relay 6RSCA is operated over an obvious path including make contact 6RSC–4. The operation of relay 6RSCA opens the path from battery to the RSP relays of all the intercept trunk circuits, thereby preventing any of them from operating.

When relay 6RSC operated, contact 6RSC–1, FIG. 8, opened the operate path for the applique connector relays in the number group applique circuits. This prevents a number group applique circuit from seizing a sender. Assuming that intercept sender circuit 119–1 is idle and relay 6ISC is operated, the closure of contact 6RSC–5, FIG. 6, completes a path from ground through contact 6ISC–3 to select magnet relay 6SEL1. The operation of relay 6SEL1 closes a path from ground through make contact 6SEL1–1, make contact 6RSC–2, make contact 2RSP–3, normally closed contact 2SA–1, and the winding of hold magnet relay 2HM to battery. Intercept trunk circuit **111–*n* is thus connected through intercept trunk connector 121 to intercept sender circuit 119–1**.

The operation of relay 6RSC also closed contact 6RSC–6, FIG. 6, which applied battery to cable 8–6 through a cross-connection field. It will be recalled that cable 8–6 is used to transfer called number information to register 900 in intercept sender circuit 119–1. The aforementioned cross-connection field is set up in a predetermined manner to place a predetermined code on the conductors of cable 8–6. This predetermined code is transmitted through make contacts 6ISC–4 into register 900 over cable 69. Relay 6CK then operates, releasing relay 6ISC. Intercept sender circuit 119–1 outpulses, in the manner described above, the predetermined code in register 900 over outgoing trunk 201 to the automatic intercept announcement system. This latter system is equipped to recognize this code as indicating that the called number is in an unequipped thousands group and informs the calling party thereof.

The remainder of the operation of the system is the same as previously described, except that when relay 2SA operates, it causes relay 2RSP to release which, in turn, releases relay 6RSC and allows relay 6RSC to be operated by the next intercept trunk circuit in the chain. The release of relay 6RSC then releases relay and all the common circuitry is restored to normal. Relay 6RSCA is a slow release relay in order to insure the release of relay 6RSC between successive call seizures.

Accordingly, I have shown an arrangement for use in a telephone switching office of the crossbar type whereby a called number which is on intercept may be transmitted to an automatic intercept announcement system and the calling party connected thereto. Applique circuits are provided and are connected on an individual basis to the number groups in the switching office. The seizure of a number group by the marker on an intercepted call activates the corresponding applique circuit to seize an intercept sender and an intercept trunk to the announcement system. Cross-connections from the number group to the applique circuit allow the applique circuit to transmit the called number to the intercept sender which in turn transmits this number to the announcement system over the seized intercept trunk. The marker is already equipped to connect the calling party to one of the intercept trunks, but this arrangement forcibly channels the call to the particular trunk which has been seized. In the alternative, if the called number is in an unequipped thousands group so that there is no number group corresponding to the called number, the marker seizes an intercept trunk without seizing a number group and the instant arrangement causes the seized trunk to seize an intercept sender circuit which transmits a predetermined code over the seized trunk to the announcement system.

I claim:

1. In a telephone system including:
- a plurality of lines;
- a plurality of trunks;
- a marker circuit for selectively connecting said lines to said trunks;
- a number group circuit arranged to provide numerical designations for said lines;
- circuit means for connecting one of said lines calling a currently unassigned number to one of said trunks comprising:
- an intercept sender circuit arranged to transmit information over any of said trunks;
- means connected to said number group circuit for transferring digits corresponding to said unassigned number from group circuit to said intercept sender circuit;
- control means for selecting a particular one of said trunks and for connecting said intercept sender circuit to said particular trunk; and
- means for forcing said marker circuit to connect said calling line to said particular control 2. In a telephone system the combination in accordance with claim 1 wherein said control means includes preference chain means for selecting said particular trunk prior to the transfer of said digits by said transferring means.

3. In a telephone system, the combination in accordance with claim 1 wherein said forcing means includes means for indicating to said marker circuit the idle or busy status of each of said trunks and means for selectively controlling said status indicating means to indicate to said marker circuit that only said particular trunk is idle.

4. In a telephone system, the combination in accordance with claim 1 wherein said number group circuit is not arranged to provide numerical designations for said currently unassigned number, said circuit means further comprising means for transmitting predetermined digits to said intercept sender circuit.

5. In a telephone system including;
- a plurality of lines each identifiable by an assigned directory number and a corresponding equipment location;
- a plurality of trunks;
- a marker for selectively connecting aid lines to said trunks;
- a plurality of number group circuits each arranged to translate predetermined assigned directory numbers into the corresponding equipment locations, said marker circuit interrogating one of said number group circuits in accordance with predetermined digits of called directory numbers;
- circuit means for connecting one of said lines calling a currently unassigned directory number to one of said trunks comprising:
- an intercept sender arranged to transmit information over any of said trunks;
- a plurality of applique circuits each connected to one of said number group circuits and activated in response to the interrogation of said one of said number group circuits by said marker circuit on a call to said unassigned directory number for transferring digits, corresponding to said unasssigned directory number to said intercept sender;
- control means for selecting a particular one of said trunks and for connecting said intercept sender to said particular trunk; and
- means for forcing said marker to connect said calling line to said particular trunk.

6. In a telephone system, the combination in accordance with claim 5 further comprising lockout means interconnecting said plurality of applique circuits so as to allow only the activated one of said plurality of applique circuits to transfer digits to said intercept sender.

7. In a telephone system, the combination in accordance with claim 5 further including a first preference chain linking said trunks and wherein said control means selects said particular trunk responsive to the activation of one of said plurality of applique circuits as directed by said first preference chain.

8. In a telephone system, the combination in accordance with claim 5 wherein said forcing means includes means for indicating to said marker the idle or busy status of each of said trunks and means including a second preference chain linking said trunks for selectively controlling said status-indicating means to indicate to said marker that only said particular trunk is idle.

9. In a telephone system, the combination in accordance with claim 5 wherein said circuit means further comprises discriminating means responsive to the connection of said calling line to said particular trunk by said marker for transmitting predetermined digits to said intercept sender when none of said plurality of number group circuits is arranged to translate said currently unassigned directory number.

10. In a telephone system, the combination in accordance with claim 9 further including a first preference chain linking said trunks and wherein said control means selects said particular trunk responsive to operation 11. In a telephone system, the combination in accordance with claim 10 wherein said forcing means includes means for indicating to said marker the idle or busy status of each of said trunks and means including a second preference chain linking said trunks for selectively controlling said status indicating means to indicate to said marker that only said particular trunk is idle.

12. In a telephone system, an arrangement for connecting a calling line to one of a plurality of trunks to an intercept system comprising:
- means responsive to a call to a number on intercept for seizing an idle one of the trunks to the intercept system and for transmitting to the intercept system over said seized trunk the called number; and
- means for then controlling the connection of the calling line to said seized trunk, said controlling means including means for causing only said seized trunk to thereupon appear to be idle.

13. In a telephone system, an arrangement for connecting a calling line to one of a plurality of trunks to an intercept system comprising:
- means for connecting calling lines to trunks to the intercept system;
- means independent of said connecting means and responsive to a call to a number on intercept for seizing an idle one of the trunks to the intercept system; and
- means for causing only aid seized trunk to appear idle to said connecting means whereby said connecting means is forced to connect the calling line to said seized trunk.

14. In a telephone system, the arrangement in accordance with claim 3 further comprising means responsive to said seizing of said trunk to the intercept system for transmitting to the intercept system called number.